United States Patent
Lim

(10) Patent No.: US 6,931,127 B2
(45) Date of Patent: Aug. 16, 2005

(54) ENCRYPTION DEVICE USING DATA ENCRYPTION STANDARD ALGORITHM

(75) Inventor: Young-Won Lim, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 791 days.

(21) Appl. No.: 09/866,874

(22) Filed: May 30, 2001

(65) Prior Publication Data

US 2002/0009196 A1 Jan. 24, 2002

(30) Foreign Application Priority Data

May 31, 2000 (KR) ......................................... 2000-29631
Jun. 9, 2000 (KR) ......................................... 2000-31574

(51) Int. Cl.[7] ................................................ H04K 1/00
(52) U.S. Cl. ......................................... 380/37; 713/174
(58) Field of Search .......................... 380/37, 28, 259, 380/29; 713/174

(56) References Cited

U.S. PATENT DOCUMENTS 6,347,143 B1 * 2/2002 Goff et al. ..................... 380/37

OTHER PUBLICATIONS

Hardware Design and Performace Estimation of□□The 128–bit Block Cipher CRYPTON□□□□Eunjong Hong, Jai–Hoon Chung, and Chae Hoon Lim□□.*

Efficient 8–Cycle DES Implementation□□Young Won Lim.*

* cited by examiner

Primary Examiner—Gregory Morse
Assistant Examiner—Andrew L Nalven
(74) Attorney, Agent, or Firm—Pillsbury Winthrop Shaw Pittman LLP

(57) ABSTRACT

An encryption device of the present invention eliminates data contention and minimizes area by using a faster memory that can access data multiple times within a given time. An encryption device for performing encryption of plain text blocks using data encryption standard algorithm, wherein the encryption device includes an initial permutation unit, a data encryption unit having n-stage (n is an even number equal to or larger than four) pipeline structure using a first clock and a second clock and an inverse initial permutation unit, the encryption device comprising: a multiplexer for selecting one of a half of n 48-bit inputs; 8 S-Boxes, each for receiving 6-bit address among the selected 48-bit and outputting 4-bit data; a demultiplexer for distributing 4-bit data from each of the S-Boxes to the half of n outputs; and a controller for control the multiplexer and the demultiplexer with a third clock and a fourth clock, wherein the third and the fourth clock are faster than the first and the second clocks by n/2 times.

7 Claims, 16 Drawing Sheets

FIG. 2
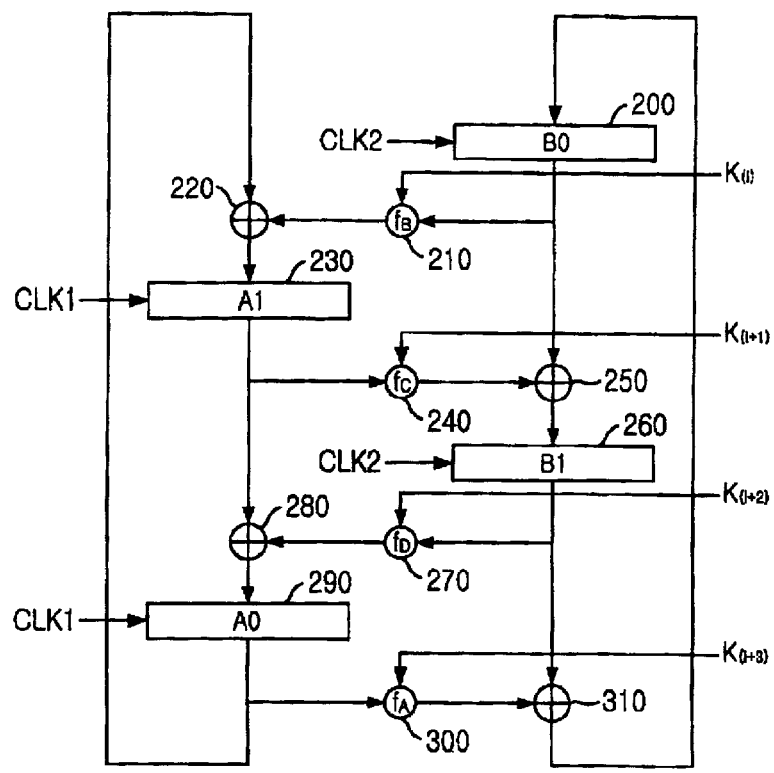
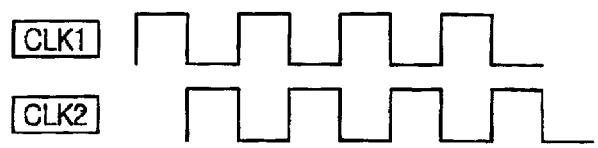
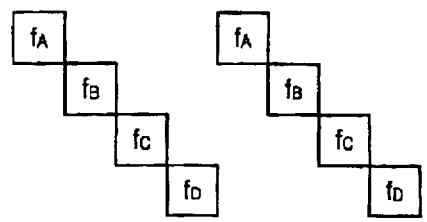
*IN CASE OF NO PIPELINE
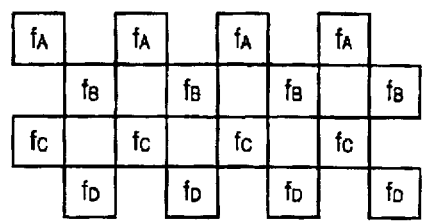
*IN CASE OF PIPELINE

FIG. 8

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ | $t_{17}$ | $t_{18}$ | $t_{19}$ |
|---|---|---|---|---|---|---|---|---|---|---|---|---|---|---|---|---|---|---|---|---|
| A0 | $a_0$ | | $c_0$ | | $e_0$ | | $g_0$ | | $b_7$ | | $d_7$ | | $f_7$ | | $h_7$ | | $b_{15}$ | | $d_{15}$ | |
| B0 | | $b_0$ | | $d_0$ | | $f_0$ | | $h_0$ | | $b_8$ | | $d_8$ | | $f_8$ | | $h_8$ | | $b_{16}$ | | $d_{16}$ |
| A1 | – | | $b_1$ | | $d_1$ | | $f_1$ | | $h_1$ | | $b_9$ | | $d_9$ | | $f_9$ | | $h_9$ | | – | |
| B1 | | – | | $b_2$ | | $d_2$ | | $f_2$ | | $h_2$ | | $b_{10}$ | | $d_{10}$ | | $f_{10}$ | | $h_{10}$ | | – |
| A2 | – | | – | | $b_3$ | | $d_3$ | | $f_3$ | | $h_3$ | | $b_{11}$ | | $d_{11}$ | | $f_{11}$ | | $h_{11}$ | |
| B2 | | – | | – | | $b_4$ | | $d_4$ | | $f_4$ | | $h_4$ | | $b_{12}$ | | $d_{12}$ | | $f_{12}$ | | $h_{12}$ |
| A3 | – | | – | | – | | $b_5$ | | $d_5$ | | $f_5$ | | $h_5$ | | $b_{13}$ | | $d_{13}$ | | $f_{13}$ | |
| B3 | | – | | – | | – | | $b_6$ | | $d_6$ | | $f_6$ | | $h_6$ | | $b_{14}$ | | $d_{14}$ | | $f_{14}$ |

FIG. 15
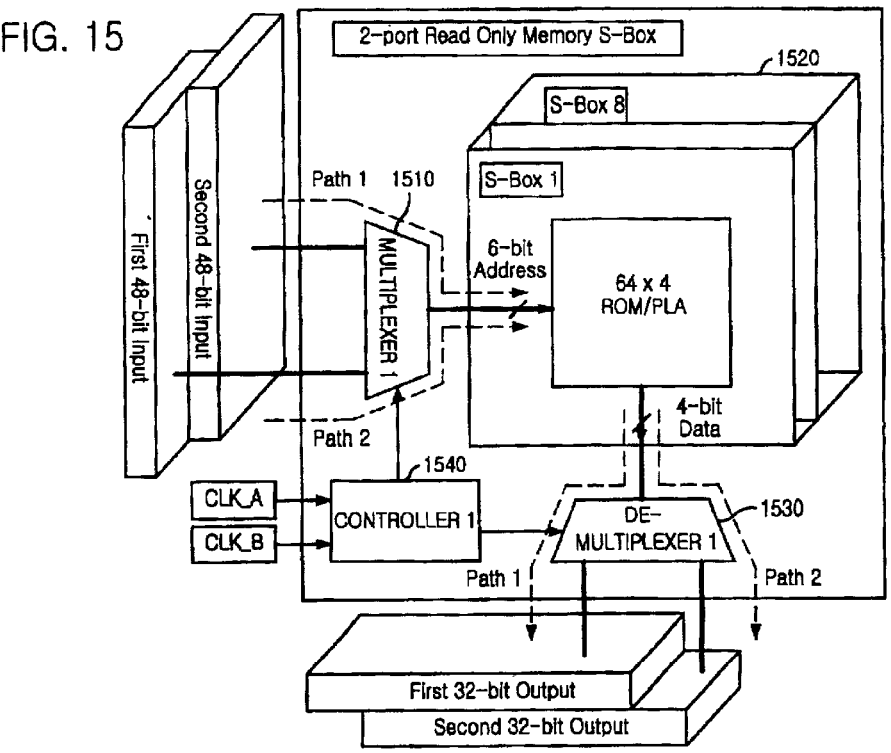
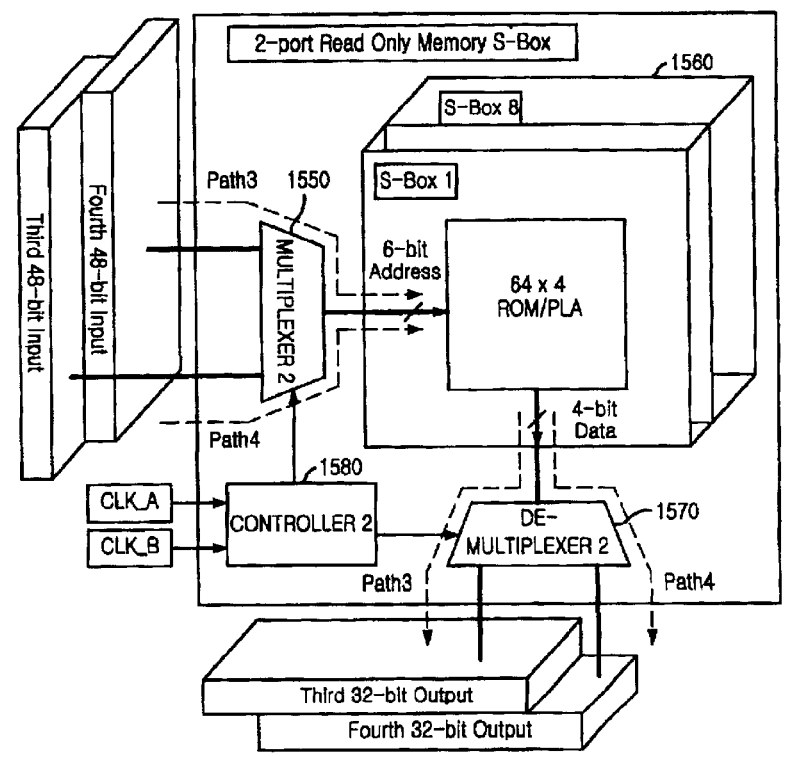

ENCRYPTION DEVICE USING DATA ENCRYPTION STANDARD ALGORITHM

FIELD OF THE INVENTION

The present invention relates to an encryption device; and, more particularly, to an encryption device using data encryption standard algorithm.

PRIOR ART OF THE INVENTION

DES (Data Encryption Standard) algorithm has come to the more attention in this environment of the wider usage of networks. Especially, the DES is widely used in Internet security applications, remote access server, cable modem or satellite modem.

The DES is fundamentally a 64-bit block cipher having 64-bit block input and output, 56 bits among the 64-bit key block for encryption and decryption and remaining 8 bits for parity checking. And, the DES outputs a 64-bit plain text block and a 64-bit cipher text generated from the input of the 56-bit key.

In a major technique, the DES is implemented by permutation (P-Box), substitution (S-Box) and key schedule generating sub-key.

Inside of data encryption is implemented in such a way to iteration of 16 round operations and constructed by an initial permutation (IP) of input part and an inverse initial permutation ($IP^{-1}$) of output part.

FIG. 1 is a detailed diagram of the cipher function and the S-Box permutation unit of a general DES architecture.

Referring to FIG. 1, the cipher function f includes an expansion permutation unit 110, an exclusive-OR (XOR) unit 120, an S-Box permutation unit 130, a P-Box permutation unit 140 and an XOR unit 150.

The expansion permutation unit 110 performs expansion permutation over 32-bit data ($R_{(i-1)}$) from a right register registering 32-bit text block to output 48-bit data.

The XOR unit 120 performs XOR operation over the 48-bit data from the expansion permutation unit 110 and a sub-key ($K_i$) from a key scheduler.

The S-Box permutation unit 130 performs substitution over 48-bit data from the XOR unit 120 to output 32-bit data.

The P-Box permutation unit 140 performs permutation over 32-bit data from the S-Box permutation unit 130.

The XOR unit 150 performs XOR operation over 32-bit data from the P-Box permutation unit 140 and 32-bit data ($L_{(i-1)}$) from a left register.

The key scheduler includes two shift units 160 and 170 and a compression permutation unit 180. Each of the shift units 160 and 170 respectively shifts corresponding 28 bits, half of 56-bit key data.

The compression permutation unit 180 receives two blocks from the shift units 160 and 170 to compress them to the sub key.

In particular, the S-Box permutation unit 130 includes 8 S-Boxes for receiving 48-bit data and outputting 32-bit data. That is, 48-bit data block is divided into 8 6-bit data, each applied to the corresponding S-Box of the 8 S-Boxes and each of the 8 S-Boxes outputs 4-bit data. Accordingly, 48-bit data is permutated to 32-bit data. The S-Box permutation unit 130 requires a memory, e.g., a programmable logic array (PLA) or a read only memory (ROM), because it employs table look-up technique. Since each of the S-Boxes outputs 4 bits for 6-bit input, it requires 64×4 memory capability and the S-Box permutation unit 130 requires 8×64×4 memory capability. Accordingly, the S-Box permutation unit 130 takes relatively large area in a chip.

FIG. 2 is a block diagram of a DES architecture having 4-stage pipeline structure using a 2 phases clock, which has an effect on processing capability and is applied to an embodiment of the present invention.

Referring to FIG. 2, in the DES algorithm, 64-bit plain text block undergone an IP unit is divided into two blocks, $a_0$ and $b_0$. The $a_0$ and $b_0$ are respectively registered at a first left register (A0) 290 and a first right register (B0) 200 by using a first clock (CLK1) and a second clock (CLK2).

32-bit data registered at the first right register (B0) 200 is encrypted by the cipher function $f_B$ 210 using the sub-key ($K_{(i)}$) from the key scheduler and the encrypted 32-bit data is X-ORed with the 32-bit data registered at the first left register (A0) 290 at the X-OR unit 220. 32-bit data from the X-OR unit 220 is registered at a second left register (A1) 230 by using a first clock (CLK1).

32-bit data registered at the second left register (A1) 230 is encrypted by the cipher function $f_C$ 240 using the sub-key ($K_{(i+1)}$) from the key scheduler and the encrypted 32-bit data is X-ORed with the 32-bit data registered at the first right register (B0) 200 at the X-OR unit 250. 32-bit data from the X-OR unit 250 is registered at a second right register (B1) 260 by using the second clock (CLK2).

32-bit data registered at the second right register (B1) 260 is encrypted by the cipher function $f_D$ 270 using the sub-key ($K_{(i+2)}$) from the key scheduler and the encrypted 32-bit data is X-ORed with the 32-bit data registered at the second left register (A1) 230 at the X-OR unit 280. 32-bit data from the X-OR unit 280 is registered at the first left register (A0) 290 by using the first clock (CLK1).

32-bit data registered at the first left register (A0) 290 is encrypted by the cipher function $f_A$ 300 using the sub-key ($K_{(i+3)}$) from the key scheduler and the encrypted 32-bit data is X-ORed with the 32-bit data registered at the second right register (B1) 260 at the X-OR unit 310. 32-bit data from the X-OR unit 310 is registered at the first right register (B0) 200 by using the second clock (CLK2).

At a final round, 32-bit of the first left register (A0) 290 becomes block $b_{15}$ and 32-bit from the X-OR unit 310 becomes $b_{16}$.

The second clock (CLK2) is a delayed version of the first clock (CLK1) by ½ period. At a rising edge of the first clock (CLK1), new data are registered at the register A0 and A1. At a rising edge of the second clock (CLK2), new data are registered at the register B0 and B1.

FIG. 3 is a timing diagram for explaining operation of the DES architecture having the 4-stage pipeline structure in FIG. 2.

Referring to FIG. 3, 32-bit data blocks $a_0$ and $b_0$ are generated by dividing initial-permuted 64-bit plain text block to two 32-bit blocks and $a_0$ and $b_0$ are respectively registered at registers A0 and B0 at $t_0$ of the first clock (CLK1) and $t_1$ of the second clock (CLK2). Computation of $b_1$($b_1=a_0 \oplus f(b_0, K_1)$) is started from $t_1$ and the computed value is registered at the register A1 at $t_2$. Because the registers A0 and B0 are registered by the first clock (CLK1) and the second clock (CLK2) which are delayed from each other, $a_0$ registered at the register A0 remains to $t_2$ so that $a_0$ can be used to compute $b_1$ at $t_1$–$t_2$ period. $b_1$ is remained to $t_4$ so that $b_1$ can be used to compute $b_2$ at $t_2$–$t_1$ period. In other words, times which the left registers register new data are $t_0, t_2, t_4, \ldots$, and times which the right registers register new data are $t_1, t_3, t_5, \ldots$.

Because $b_0$ registered in the register B0 at $t_1$ and $b_1$ registered in the register A1 at $t_2$ remains to $t_2$–$t_3$, $b_2(b_2 = b_0 \oplus f(b_1, K_2))$ is computed at $t_2$–$t_3$ period and registered at the register B1 at $t_4$ by the second clock (CLK2). Computed values $b_3$, $b_7$, $b_{11}$, $b_{15}$ are registered in the first left register (A0) at rising edges of the first clock (CLK1), $t_4$, $t_8$, $t_{12}$, $t_{16}$, and computed values $b_5$, $b_9$, $b_{13}$ are registered in the second left register (A1) at rising edges of the first clock (CLK1), $t_6$, $t_{10}$, $t_{14}$. Similarly, computed values $b_4$, $b_8$, $b_{12}$, $b_{16}$ are registered in the first right register (B0) at rising edges of the second clock (CLK2), $t_5$, $t_9$, $t_{13}$, $t_{17}$, and computed values $b_6$, $b_{10}$, $b_{14}$ are registered in the second register (B1) at rising edges of the second clock (CLK2), $t_7$, $t_{11}$, $t_{15}$.

As described above, by accessing stored values at the registers simultaneously using the clock having 2 phases, the computation time for $b_1, b_2, \ldots, b_{16}$ can be reduced to 8.5 cycles.

Typically, for a given key, 64-bit plain text or cipher text blocks to be encrypted or decrypted are applied continuously. For example, because an encryption technique for use in MCNS cable modem performs encryption in unit of MAC frame, at most 1,518 bytes plain text blocks are encrypted by using an identical key. That is, 16 round DES cores should be computed a number of plain text blocks by using the identical key. In this case, the pipeline structure can increase the processing capability.

FIG. 4 is a timing diagram for explaining operation of pipeline of the DES architecture having the conventional 4-stage pipeline structure in FIG. 2.

Referring to FIG. 4, by using the pipeline structure, two plain text blocks can be processed during 8.5 cycles. And, inserting new plain text blocks $c_0$ and $d_0$ to the registers A0 and B0 at $t_2$ and $t_3$ during a vacant period in FIG. 3, the plain text block $d_i$ can be computed while computation of the plain text block $b_i$. In order to encrypt new plain text blocks $b_i$ and $d_i$ during every period $t_0$–$t_1$, $t_1$–$t_2$, . . . , two cipher functions are performed simultaneously for every period. The number of the plain text blocks that can be processed within 8.5 cycles can be increased by two times. However, the S-Box forming the cipher function should be added.

Referring to FIG. 2 again, it shows a timing diagram for explaining operations of the cipher function when the pipeline of the DES architecture having the conventional 4-stage pipeline structure is not used and when the pipeline is used.

In case that one 64-bit plain text block is encrypted, i.e., the pipeline is not used, the cipher functions $f_A$, $f_B$, $f_C$, $f_D$ can be implemented by one S-Box permutation unit because the computation of them are performed time-divisionally by the clock having 2 phases. However, because ($f_A$, $f_C$) and ($f_B$, $f_D$) are not time divided while ($f_A$, $f_B$) and ($f_C$, $f_D$) is timely divided when the two plain text blocks are encrypted simultaneously, two S-Box are required.

FIG. 5 is a detailed block diagram of a conventional single port S-Box permutation unit.

Referring to FIG. 5, conventionally, the pipeline operation is performed by using the two S-Box permutation units and each of the S-Box permutation units includes 8 S-Boxes, input and output of each S-Box being 48-bit data and 32-bit, respectively. Each S-Box is formed by 64×4 ROM or PLA and has a path receiving 6-bit address and outputting 4-bit data. Accordingly, there are provided two physically separated paths, a first path and a second path, by the two S-Box permutation units.

FIG. 6 is a block diagram of a DES architecture having 8-stage pipeline structure using a 2 phases clock, which has an effect on processing capability and is applied to other embodiments of the present invention.

Referring to FIG. 6, in the DES algorithm, 64-bit plain text block undergone an IP unit is divided into two blocks, $a_0$ and $b_0$. The $a_0$ and $b_0$ are respectively registered at a first left register (A0) 660 and a first right register (B0) 600 by using a first clock (CLK1) and a second clock (CLK2).

32-bit data registered at the first right register (B0) 600 is encrypted by the cipher function $f_B$ 610 using the sub-key ($K_{(i)}$) from the key scheduler and the encrypted 32-bit data is X-ORed with the 32-bit data registered at the first left register (A0) 660 at the X-OR unit 620. 32-bit data from the X-OR unit 620 is registered at a second left register (A1) 630 by using a first clock (CLK1).

32-bit data registered at the second left register (A1) 630 is encrypted by the cipher function $f_C$ 640 using the sub-key ($K_{(i+1)}$) from the key scheduler and the encrypted 32-bit data is X-ORed with the 32-bit data registered at the first right register (B0) 600 at the X-OR unit 650. Two rounds as described above are iterated, at a final round, 32-bit of the first left register (A0) 660 becomes block $b_{15}$ and 32-bit from the X-OR unit 670 becomes $b_{16}$.

A1, A2, A3 and A0 denote the left registers, and B1, B2, B3 and B0 denote the right registers. At a rising edge of the first clock (CLK1), new data are registered at the register A0, A1, A2 and A3. At a rising edge of the second clock (CLK2), new data are registered at the register B0, B1, B2 and B3.

The second clock (CLK2) is an inverse clock and a delayed version of the first clock (CLK1) by ½ period.

FIG. 7 is a timing diagram for explaining operation of the DES architecture having the 8-stage pipeline structure in FIG. 6.

Referring to FIG. 7, 32-bit blocks $a_0$ and $b_0$ are generated by dividing initial-permuted 64-bit plain text block to two 32-bit blocks and $a_0$ and $b_0$ are respectively registered at registers A0 and B0 at $t_0$ of the first clock (CLK1) and $t_1$ of the second clock (CLK2). Computation of $b_1(b_1 = a_0 \oplus f(b_0, K_1))$ is started from $t_1$ and the computed value is registered at the register C0 at $t_2$. Because the registers A0 and B0 are registered by the first clock (CLK1) and the second clock (CLK2) which are delayed from each other, $a_0$ registered at the register A0 remains to $t_2$ so that $a_0$ can be used to compute $b_1$ at $t_1$–$t_2$ period. $b_1$ is remained to $t_4$ so that $b_1$ can be used to compute $b_2$ at $t_2$–$t_1$ period. In other words, times the second left register (A1) registers new data are $t_0$, $t_2$, $t_4$, . . . , and times the first right register (B0) registers new data are $t_1$, $t_3$, $t_5$, . . . .

Because $b_0$ registered in the register B0 at $t_1$ and $b_1$ registered in the register A1 at $t_2$ remains to $t_2$–$t_3$, $b_2(b_2 = b_0 \oplus f(b_1, K_2))$ is computed at $t_2$–$t_3$ period and registered at the register B1 at $t_4$ by the second clock (CLK2).

Computed values $a_0$, $b_7$, $b_{15}$ are registered in the first left register (A0) at rising edges of the first clock (CLK1), $t_0$, $t_8$, $t_{16}$, computed values $b_1$ and $b_9$ are registered in the second left register (A1) at rising edges of the first clock (CLK1), $t_2$ and $t_{10}$, computed values $b_3$ and $b_{11}$ are registered in the third left register (A2) at rising edges of the first clock (CLK1), $t_4$ and $t_{12}$, and computed values $b_6$ and $b_{14}$ are registered in the fourth left register (A2) at rising edges of the first clock (CLK1), $t_6$ and $t_{14}$.

Similarly, computed values $b_0$, $b_8$, $b_{16}$ are registered in the first right register (B0) at rising edges of the second clock (CLK2), $t_1$, $t_9$, $t_{17}$, computed values $b_2$, $b_{10}$ are registered in the second register (B1) at rising edges of the second clock (CLK2), $t_3$, $t_{11}$, computed values $b_4$, $b_{12}$ are registered in the third register (B2) at rising edges of the second clock (CLK2), $t_5$, $t_{13}$, and computed values $b_6$, $b_{14}$ are registered in the fourth register (B2) at rising edges of the second clock (CLK2), $t_7$, $t_{15}$.

FIG. 8 is a timing diagram for explaining operation of pipeline of the DES architecture having the 8-stage pipeline structure in FIG. 6.

Referring to FIG. 6, by using the pipeline structure, four plain text blocks can be processed during 8.5 cycles. And, inserting new plain text blocks $c_0$ and $d_0$ to the registers A0 and B0 at $t_2$ and $t_3$, $e_0$ and $f_0$ at $t_4$ and $t_5$, $g_0$ and $h_0$ at $t_6$ and $t_7$, during a vacant period in FIG. 7, the plain text block $d_i$, $f_i$, $h_i$ can be computed while computation of the plain text block $b_i$. In order to encrypt new plain text blocks $b_j$, $d_j$, $f_j$ and $h_j$ during every period $t_0$–$t_1$, $t_1$–$t_2$, $t_2$–$t_3$, . . . , four cipher functions are performed simultaneously for every period. The number of the plain text blocks that can be processed within 8.5 cycles can be increased by four times. However, three S-Box permutation units should be added.

Referring to FIG. 9, it shows a timing diagram for explaining operations of the cipher function when the pipeline of the DES architecture having the 8-stage pipeline structure is not used and when the pipeline is used.

In case that one 64-bit plain text block is encrypted, i.e., the pipeline is not used, the cipher functions $f_A$, $f_B$, $f_C$, $f_D$, $f_E$, $f_F$, $f_G$, $f_H$ can be implemented by one S-Box permutation unit because the computation of them are performed time-divisionally by the clock having 2 phases. However, because ($f_A$, $f_C$, $f_E$, $f_G$) and ($f_B$, $f_D$, $f_F$, $f_H$) are not time divided while ($f_A$, $f_B$, $f_C$, $f_D$) and ($f_E$, $f_F$, $f_G$, $f_H$) is timely divided when the four plain text blocks are encrypted simultaneously, four S-Boxes are required.

FIG. 10 is a detailed block diagram of a conventional single port S-Box permutation unit.

Referring to FIG. 10, conventionally, the pipeline operation is performed by using the four S-Box permutation units and each of the S-Box permutation units includes 8 S-Boxes, input and output of each S-Box being 48-bit data and 32-bit, respectively. Each S-Box is formed by 64×4 ROM or PLA and has a path receiving 6-bit address and outputting 4-bit data. Accordingly, there are provided four physically separated paths, a first path, a second path, a third path and a fourth path, by the four S-Box permutation units.

As described above, conventionally, a problem of an access to the memory required for the S-Box permutation unit, i.e., a data contention problem, is solved by the two physically separated paths of the two S-Box permutation units. However, since the two identical S-Box permutation units are used, area is increased.

SUMMARY OF THE INVENTION

Therefore, it is an object of the present invention to provide an encryption device eliminating data contention and minimizing area that can access data multiple times within a given time.

It is another object of the present invention to provide an encryption device reducing a chip size and increasing its performance.

In accordance with an aspect of the present invention, there is provided an encryption device for performing encryption of plain text blocks using data encryption standard algorithm, wherein the encryption device includes an initial permutation unit, a data encryption unit having n-stage (n is an even number equal to or larger than four) pipeline structure using a first clock and a second clock and an inverse initial permutation unit, the encryption device comprising: a multiplexer for selecting one of a half of n 48-bit inputs; 8 S-Boxes, each for receiving 6-bit address among the selected 48-bit and outputting 4-bit data; a demultiplexer for distributing 4-bit data from each of the S-Boxes to the half of n outputs; and a controller for control the multiplexer and the demultiplexer with the first clock and the second clock.

In accordance with another aspect of the present invention, there is provided an encryption device for performing encryption of plain text blocks using data encryption standard algorithm, wherein the encryption device includes an initial permutation unit, a data encryption unit having 8-stage pipeline structure using a first clock and a second clock and an inverse initial permutation unit, the encryption device comprising: a first multiplexer for selecting one of a first and a second 48-bit inputs; a first S-Box unit having 8 S-Boxes, each S-Box for receiving 6-bit address among selected 48-bit from the first multiplexer and outputting 4-bit data; a first demultiplexer for distributing 4-bit data from each of the S-Boxes to one of a first and a second outputs; a first controller for controlling the first multiplexer and the first demultiplexer with a third clock and a fourth clock; a second multiplexer for selecting one of a third and fourth 48-bit inputs; a second S-Box unit having 8 S-Boxes, each S-Box for receiving 6-bit address among selected 48-bit from the second multiplexer and outputting 4-bit data; a second demultiplexer for distributing 4-bit data from each of the S-Boxes to one of a third and a fourth outputs; and a second controller for controlling the second multiplexer and the second demultiplexer with the third clock and the fourth clock, wherein the third and the fourth clocks are faster than the first and the second clocks by two times.

BRIEF DESCRIPTION OF THE DRAWINGS

The above and other objects and features of the instant invention will become apparent from the following description of preferred embodiments taken in conjunction with the accompanying drawings, in which:

FIG. 2 is a block diagram of DES architecture having 4-stage pipeline structure using a 2 phases clock, which has an effect on processing capability and is applied to an embodiment of the present invention;

FIG. 8 is a timing diagram for explaining operation of pipeline of the DES architecture having the 8-stage pipeline structure in FIG. 6;

FIG. 15 is a detailed block diagram of two 2-port S-Box permutation in accordance with further another embodiment of the present invention.

PREFERRED EMBODIMENT OF THE INVENTION

Hereinafter, preferred embodiments of the present invention will be described in detail with reference to the accompanying drawings.

Embodiment 1

Figure 11:
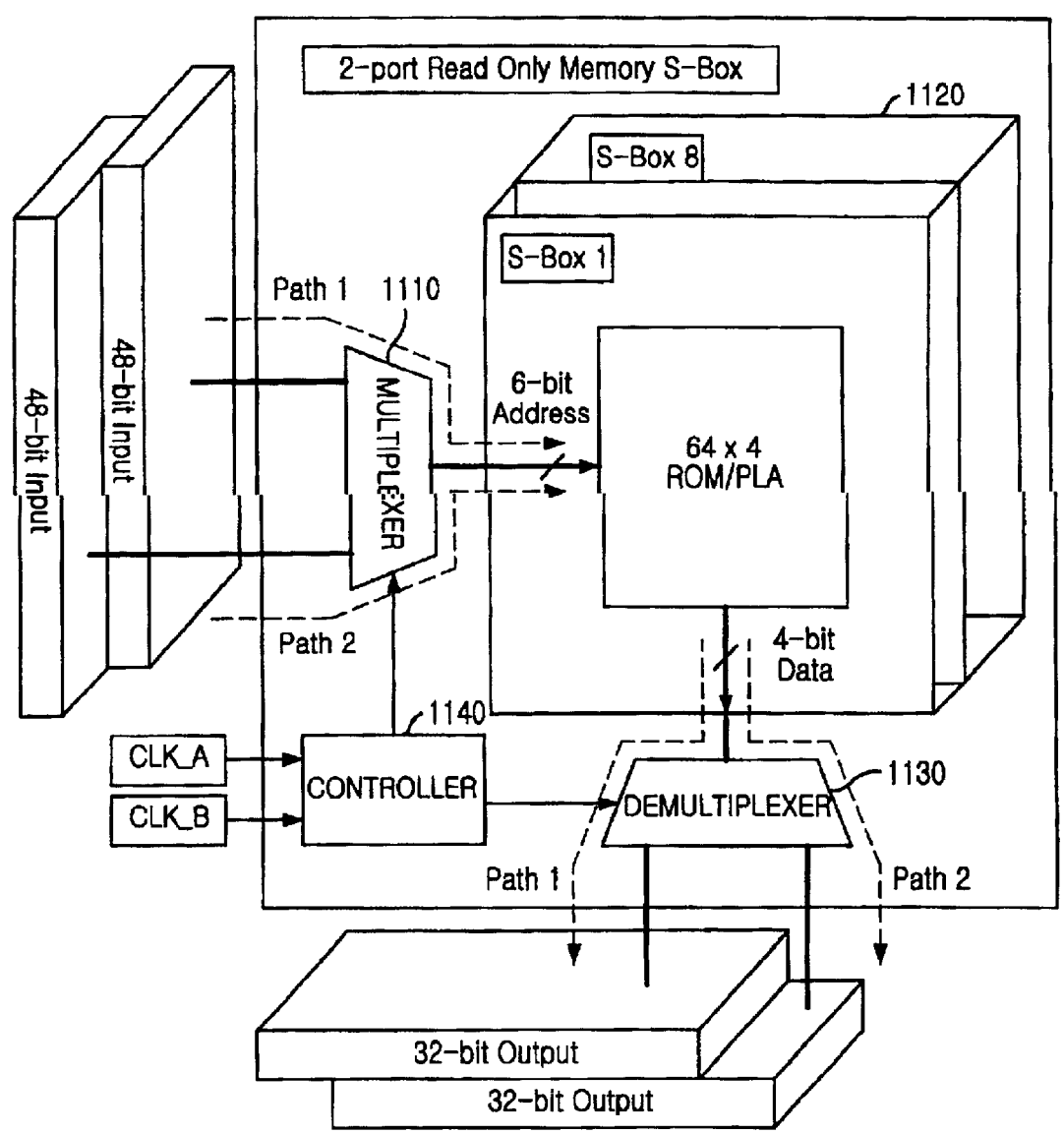
FIG. 11 is a detailed block diagram of 2-port S-Box permutation in accordance with an embodiment of the present invention.

FIG. 11 is a detailed block diagram of 2-port S-Box permutation in accordance with the present invention.

Referring to FIG. 11, a S-Box permutation unit includes a multiplexer 1110, 8 S-Boxes 1120, a demultiplexer 1130 and a controller 1140. The multiplexer 1110 selects one of two 48-bit inputs under control of the controller 1140. Each of the S-Boxes 1120 receives 6-bit address among the selected 48-bit and outputs 4-bit data. The demultiplexer 1130 distributes the 4-bit data from each of the S-Boxes 1120 to two outputs under control of the controller 1140. The controller 1140 controls the multiplexer 1110 and the demultiplexer 1130 with a first clock (CLK_A) and a second clock (CLK_B).

Figure 12:
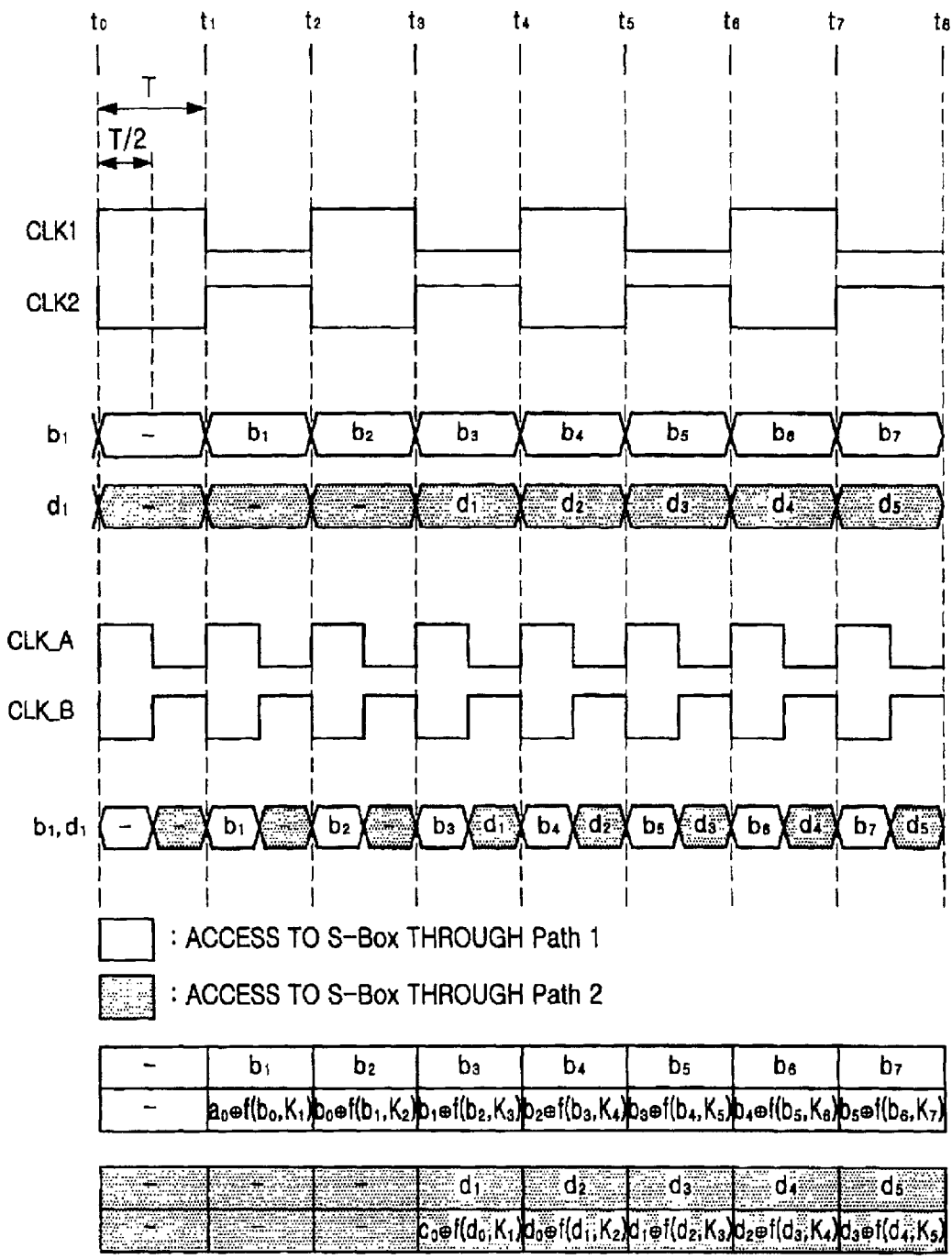
FIG. 12 is a timing diagram for explaining operation of the conventional single port S-Box permutation unit and the 2-port S-Box permutation unit of the present invention.

FIG. 12 is a timing diagram for explaining operation of the conventional single port S-Box permutation unit and the 2-port S-Box permutation unit.

Referring to FIG. 12, in the present invention, signals required to access ROM are generated by using the first clock (CLK_A) and the second clock (CLK_B) that are faster than input clocks (CLK_1, CLK_2) by two times. The data contention problem is eliminated since there exist a first path (path1) and a second path (path2) those are timely divided by the multiplexer selecting one of the first path (path1) and the second path (path2) at each time period $t_i$–$t_{i+1}$. That is, when the first clock (CLK_A) is logic high, the first path (path1) is selected and $b_i$ are computed and when the second clock (CLK_B) is logic high, the second path (path2) is selected and $d_i$ are computed.

As described above, by using only one S-Box, the present invention can reduce area of the S-Box permutation unit to a half so that circuits can be efficiently disposed, i.e., the number of net die is increased in smaller chip area so that cost is decreased.

Embodiment 2

Figure 13:
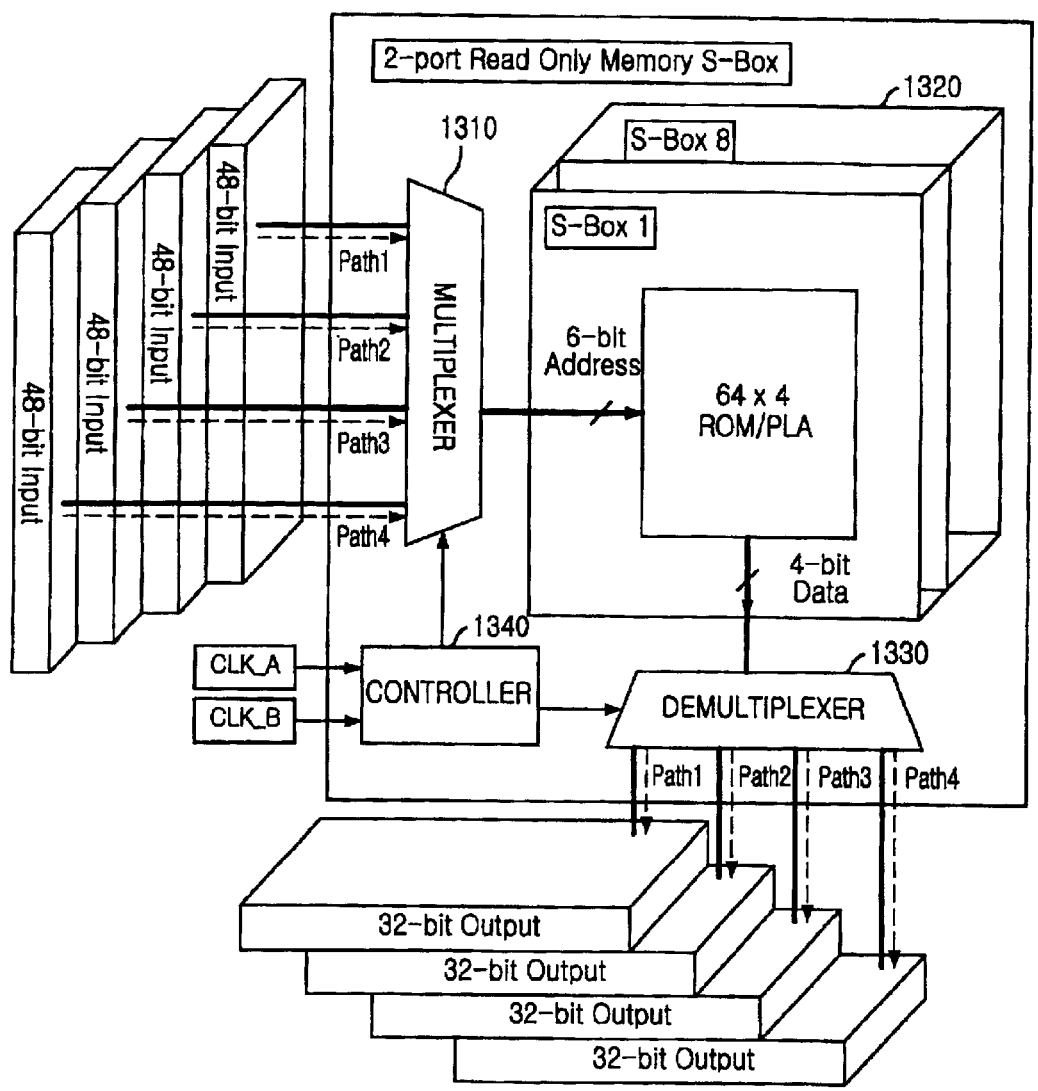
FIG. 13 is a detailed block diagram of 4-port S-Box permutation in accordance with another embodiment of the present invention.

FIG. 13 is a detailed block diagram of 4-port S-Box permutation in accordance with another embodiment of the present invention.

Referring to FIG. 13, a S-Box permutation unit includes a multiplexer 1310, 8 S-Boxes 1320, a demultiplexer 1330 and a controller 1340. The multiplexer 1310 selects one of four 48-bit inputs under control of the controller 1340. Each of the S-Boxes 1320 receives 6-bit address among the selected 48-bit and outputs 4-bit data. The demultiplexer 1330 distributes the 4-bit data from each of the S-Boxes 1320 to two outputs under control of the controller 1340. The controller 1340 controls the multiplexer 1310 and the demultiplexer 1330 with a first clock (CLK_A) and a second clock (CLK_B).

Figure 14:
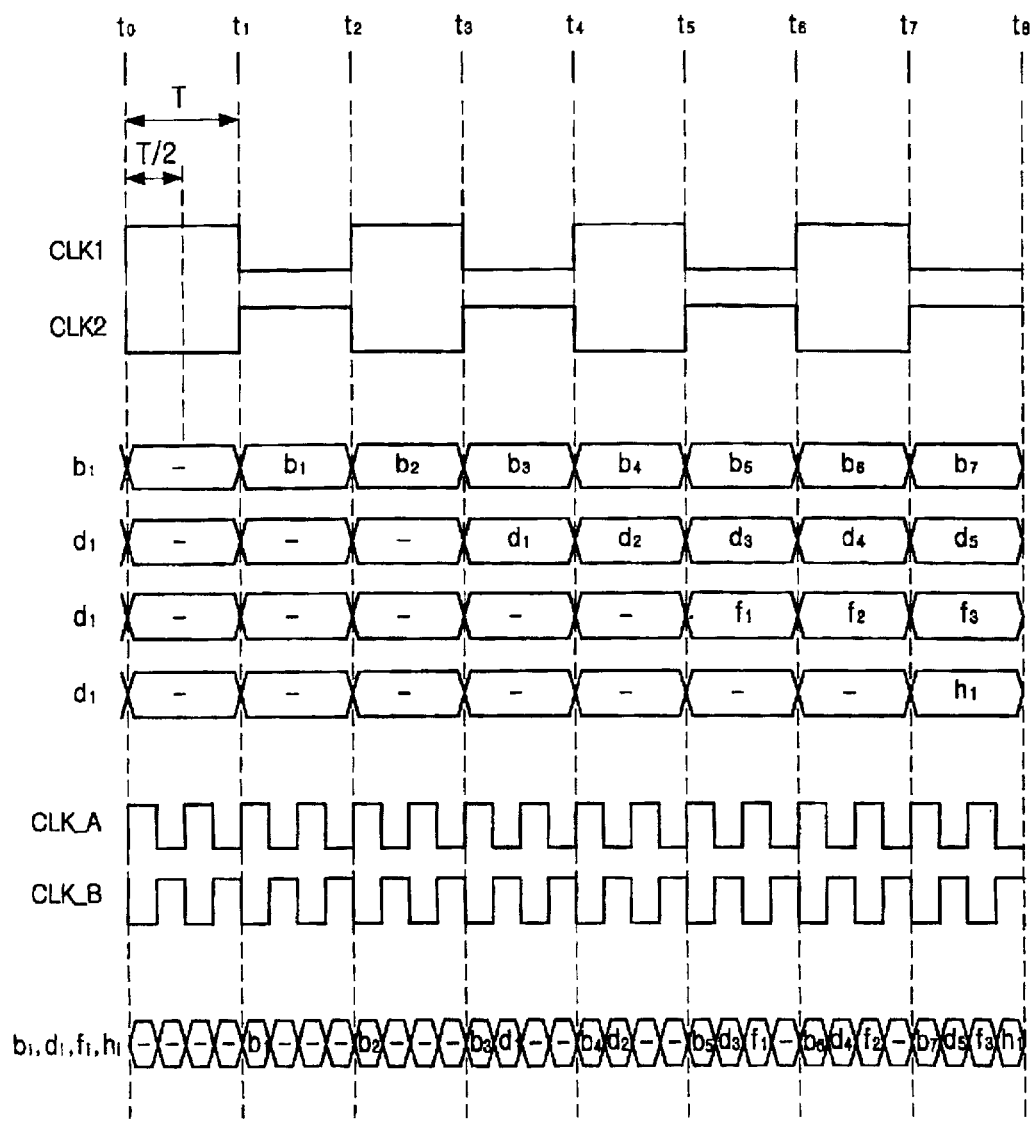
FIG. 14 is a timing diagram for explaining operation of the conventional single port S-Box permutation unit and the 4-port S-Box permutation unit of the present invention.

FIG. 14 is a timing diagram for explaining operation of the conventional single port S-Box permutation unit and the 2-port S-Box permutation unit.

Referring to FIG. 14, in the present invention, signals required to access ROM are generated by using the first clock (CLK_A) and the second clock (CLK_B) that are faster than input clocks (CLK_1, CLK_2) by four times. The data contention problem is eliminated since there exist a first path (path1), a second path (path2), a third path (path3) and a fourth path (path4) those are timely divided by the multiplexer selecting one of the first path (path1), the second path (path2), the third path (path3) and the fourth path (path4) at each time period $t_i$–$t_{i+1}$. The controller generates signals necessary to access the ROM based on the first and the second clock (CLK_A, CLK_B).

As described above, by using only one S-Box, the present invention can reduce area of the S-Box permutation unit to ¼ so that circuits can be efficiently disposed, i.e., the number of net die is increased in smaller chip area so that cost is decreased.

Figure 1:
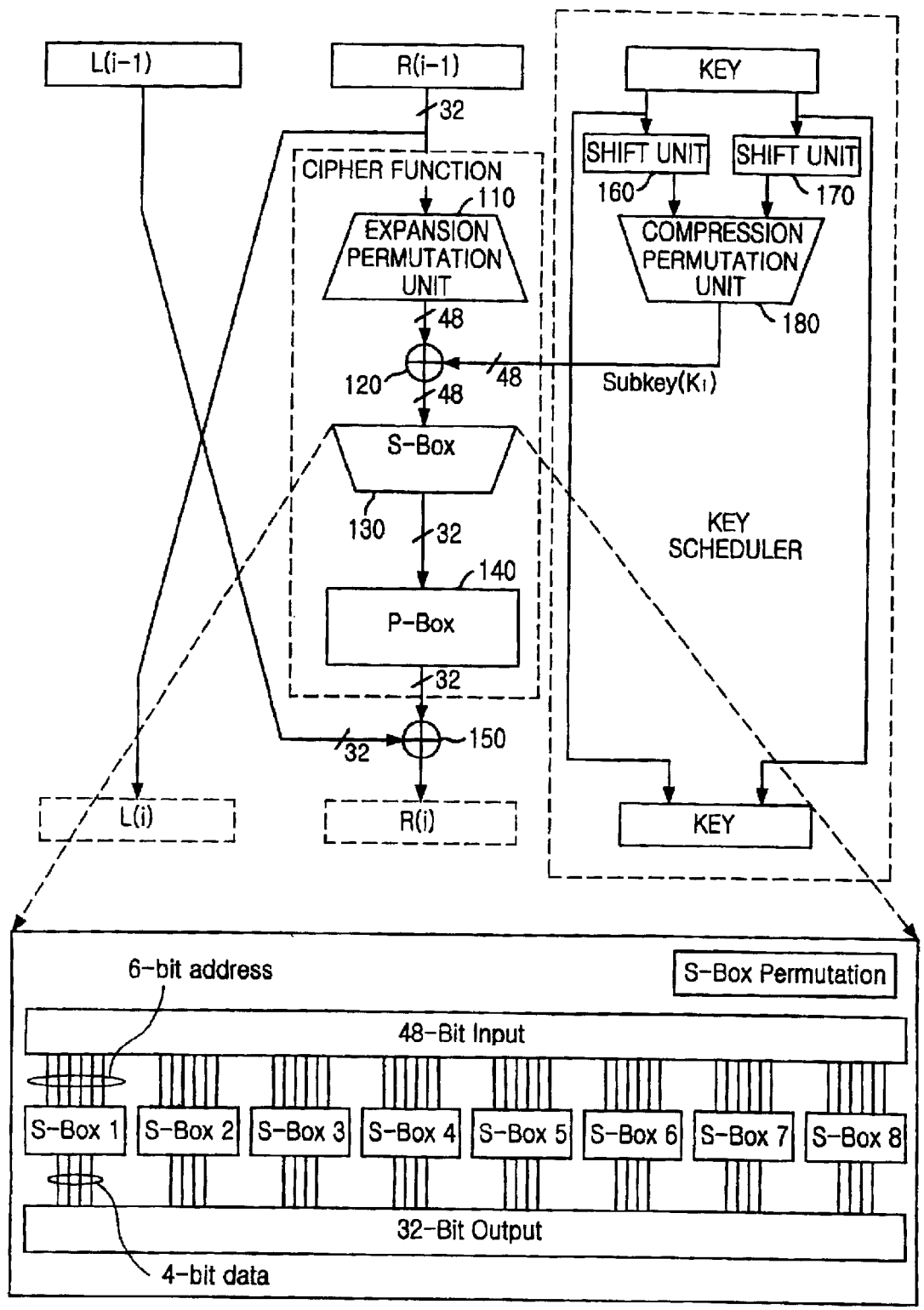
FIG. 1 is a cipher function and a S-Box permutation unit having a general DES architecture.
Figure 3:
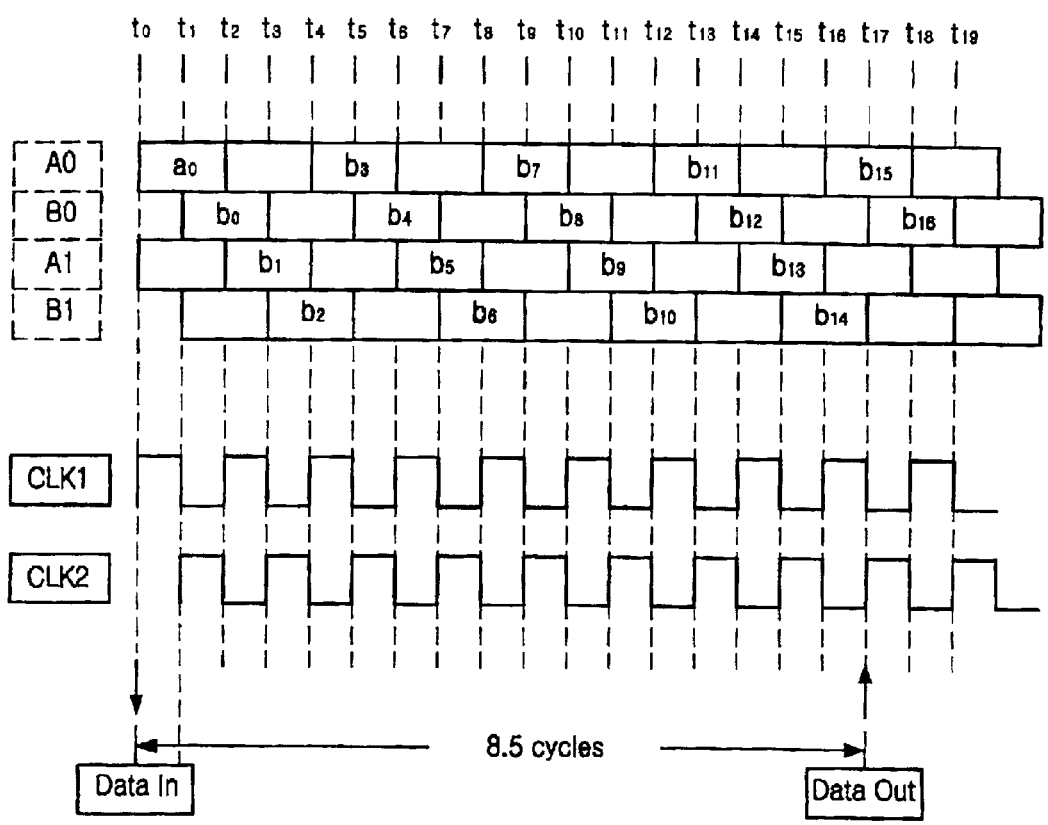
FIG. 3 is a timing diagram for explaining operation of the DES architecture having the 4-stage pipeline structure in FIG. 2.
Figure 4:
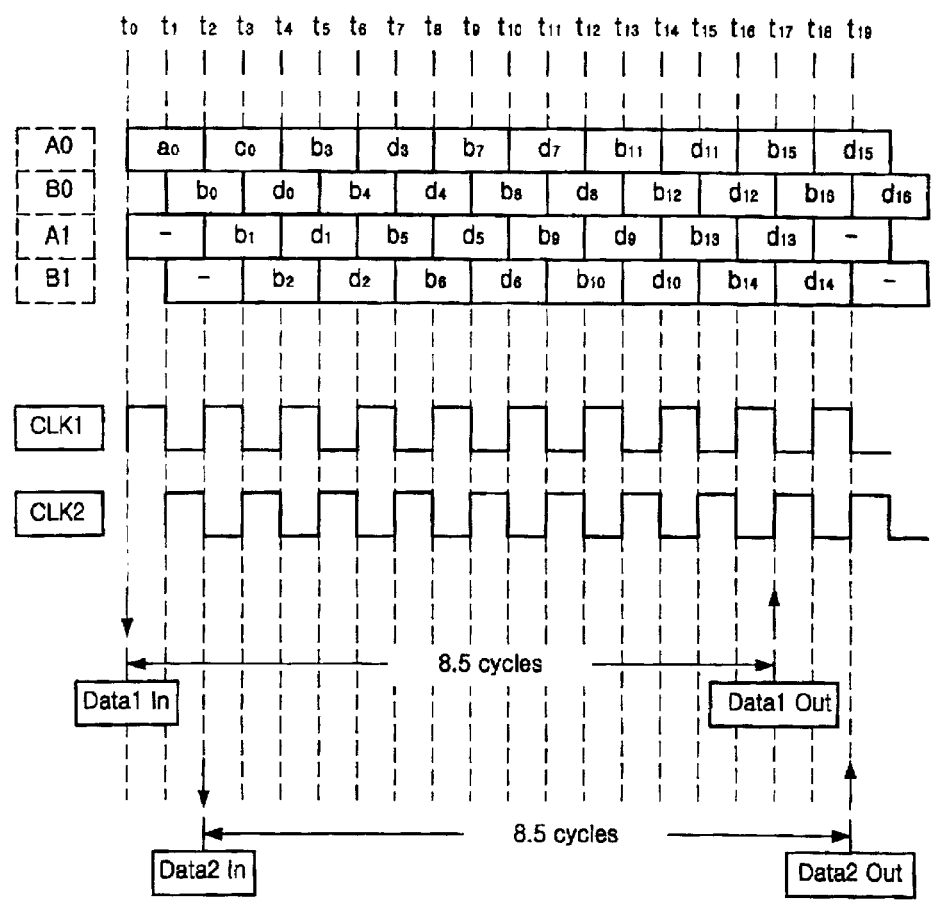
FIG. 4 is a timing diagram for explaining operation of pipeline of the DES architecture having the 4-stage pipeline structure in FIG. 2.
Figure 5:
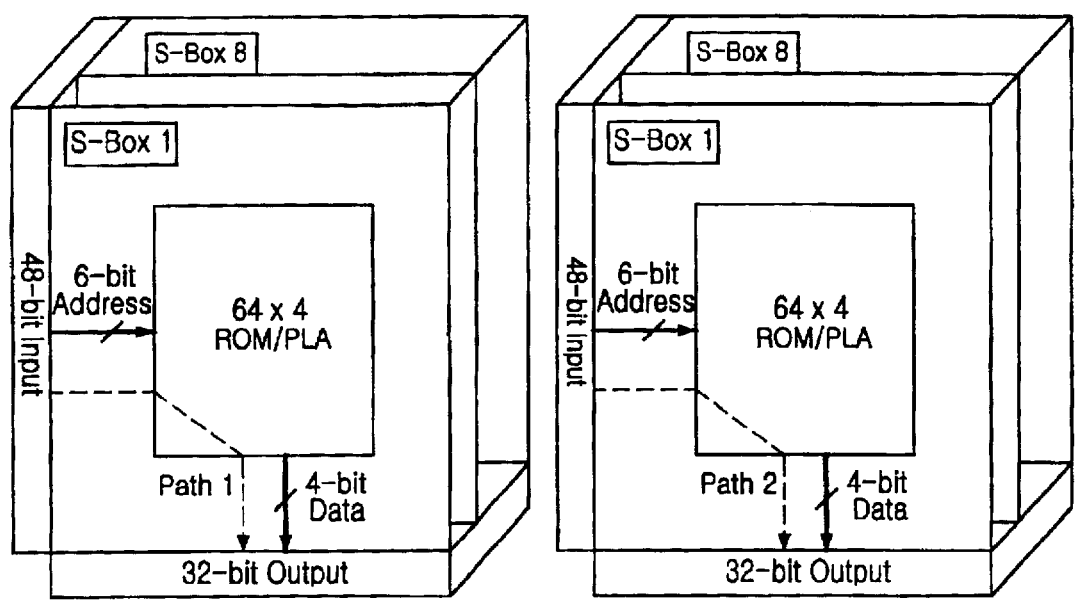
FIG. 5 is a detailed block diagram of a conventional single port S-Box permutation unit.
Figure 6:
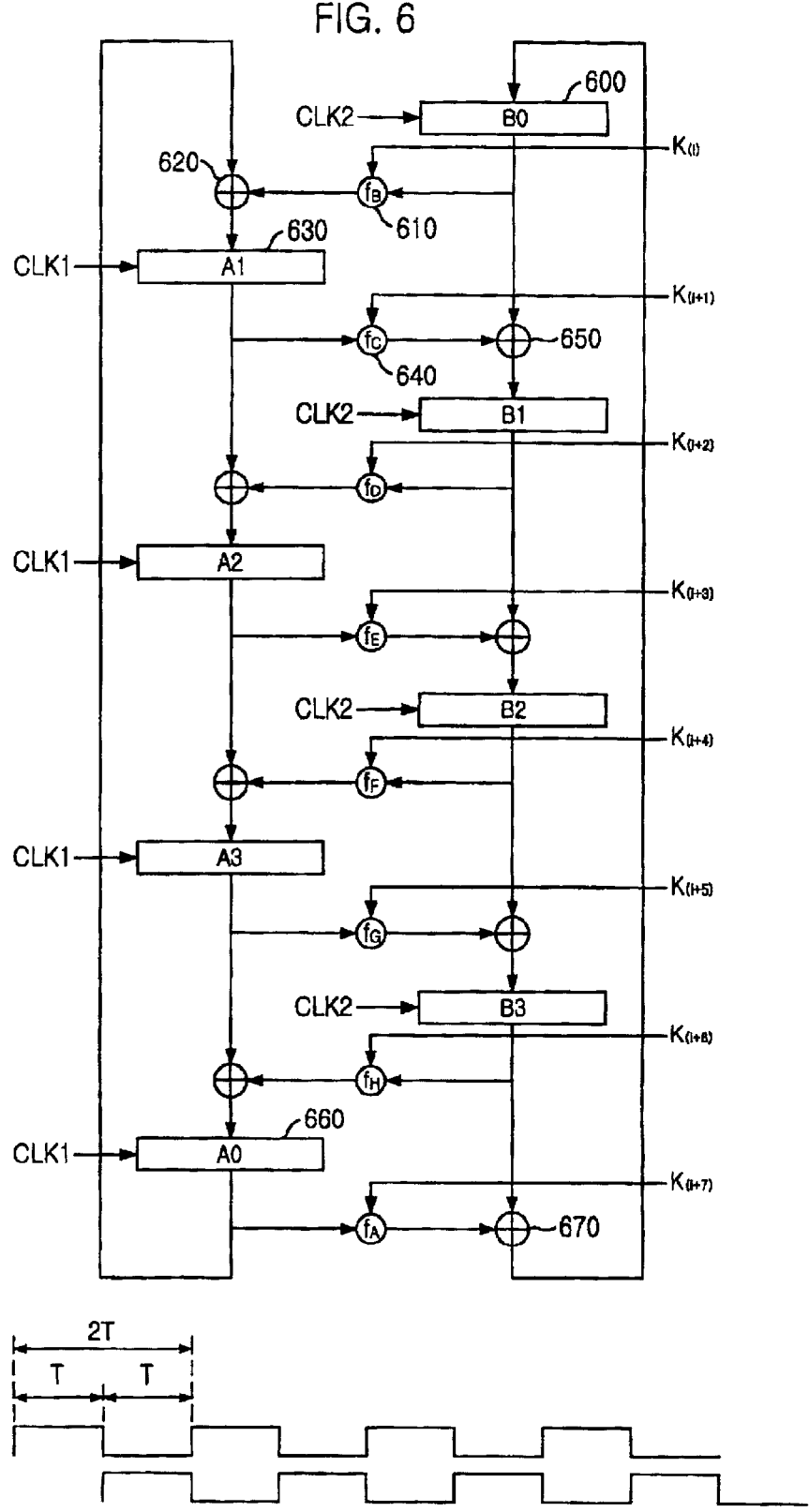
FIG. 6 is a block diagram of DES architecture having 8-stage pipeline structure using a 2 phases clock, which has an effect on processing capability and is applied to other embodiment of the present invention.
Figure 7:
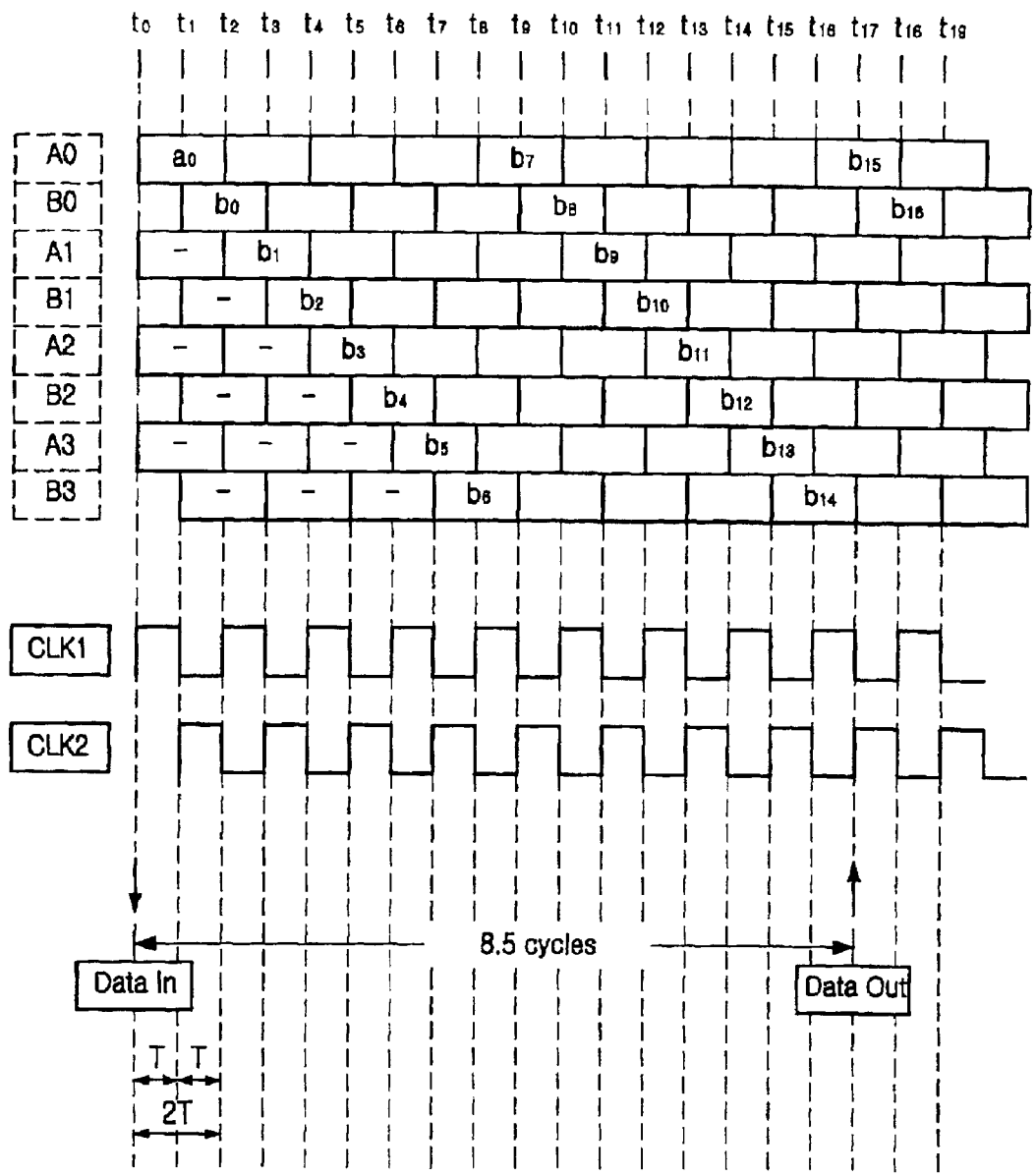
FIG. 7 is a timing diagram for explaining operation of the DES architecture having the 8-stage pipeline structure in FIG. 6.
Figure 9:
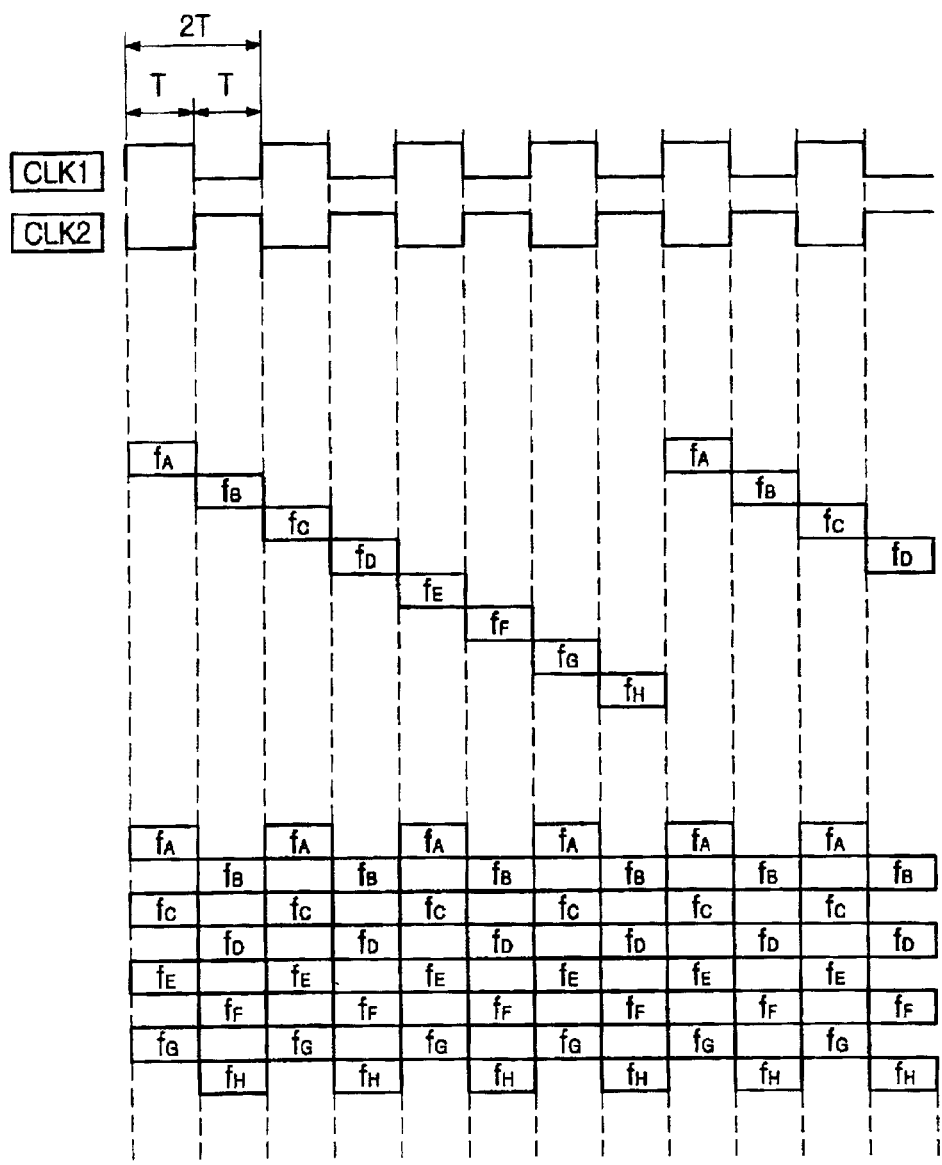
FIG. 9 is a diagram illustrating a timing diagram for explaining operations of the cipher function when the pipeline of the DES architecture having the 8-stage pipeline structure is not used and when the pipeline is used.
Figure 10:
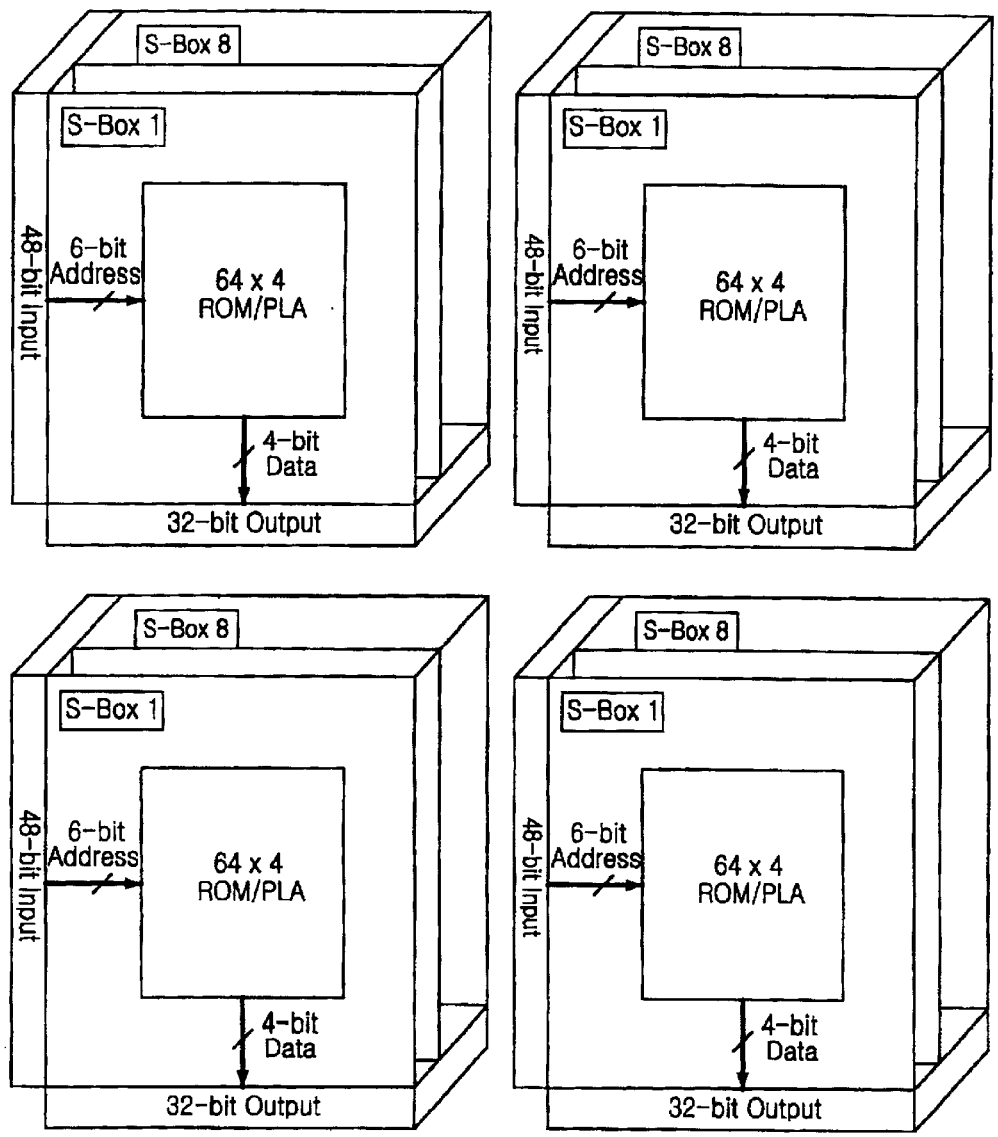
FIG. 10 is a block diagram of a conventional single port S-Box permutation unit.

The S-box in accordance with this embodiment has smaller size than the conventional S-box illustrated in FIG. 10. However, access rate of the S-box in this embodiment is slower than that of the S-box illustrated in FIG. 10.

Embodiment 3

In this embodiment, when the S-Box cannot be implemented by using faster storage device by four times, a S-Box permutation unit is implemented by two 2-port S-Boxes by using storage device two times faster than that of the S-box illustrated in FIG. 10.

Referring to FIG. 15, each of two S-Box permutations unit includes a multiplexer 1510 or 1550, 8 S-Boxes 1520 or 1560, a demultiplexer 1530 or 1570, and a controller 1540 or 1580. A first multiplexer 1510 selects one of two 48-bit inputs under control of the controller 1540. Each of first S-Boxes 1520 receives 6-bit address among the selected 48-bit and outputs 4-bit data. A first demultiplexer 1530 distributes the 4-bit data from each of the S-Boxes 1520 to two outputs under control of the controller 1540. The controller 1540 controls the multiplexer 1510 and the demultiplexer 1530 with a first clock (CLK_A) and a second clock (CLK_B). A second multiplexer 1550 selects one of two 48-bit inputs under control of the controller 1580. Each of second S-Boxes 1560 receives 6-bit address among the selected 48-bit and outputs 4-bit data. A second demultiplexer 1570 distributes the 4-bit data from each of the S-Boxes 1560 to two outputs under control of the controller 1580. The controller 1580 controls the multiplexer 1550 and the demultiplexer 1570 with a first clock (CLK_A) and a second clock (CLK_B).

Figure 16:
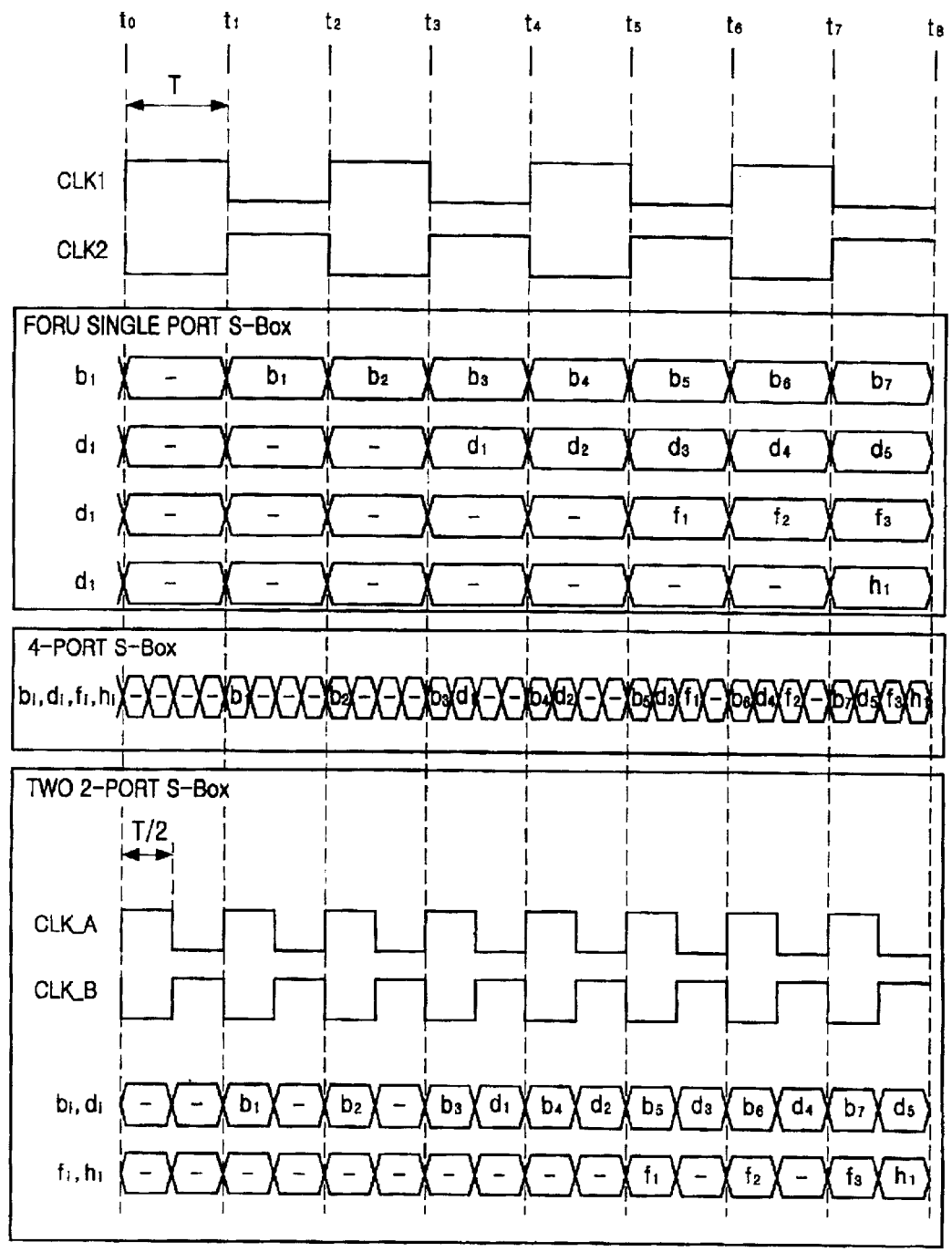
FIG. 16 is a timing diagram for explaining operation of the conventional single port S-Box permutation unit and two 2-port S-Box permutation unit of the present invention.

FIG. 16 is a timing diagram for explaining operation of the conventional single port S-Box permutation unit and the 2-port S-Box permutation unit.

Referring to FIG. 16, in the present invention, signals required to access ROM are generated by using the first clock (CLK_A) and the second clock (CLK_B) that are faster than input clocks by two times. The data contention problem is eliminated since there exist a first path (path1) and a second path (path2) those are timely divided by the multiplexer selecting one of the first path (path1) and the second path (path2) at each time period $t_i$–$t_{i+1}$. That is, when the first clock (CLK_A) is logic high, the first path (path1) and the third path (path3) are selected and $b_i$ and $f_i$ are computed and when the second clock (CLK_B) is logic high, the second path (path2) and the fourth path (path4) are selected and $d_i$ and $h_i$ are computed.

While the present invention has been shown and described with respect to the particular embodiments, it will be apparent to those skilled in the art that many changes and modifications may be made without departing from the spirit and scope of the invention as defined in the appended claims.

What is claimed is:

1. An encryption device for performing encryption of plain text blocks using data encryption standard algorithm, wherein the encryption device includes an initial permutation unit, a data encryption unit having n-stage (n is an even number equal to or larger than four) pipeline structure using a first clock and a second clock and an inverse initial permutation unit, wherein the improvement includes:
   a multiplexer for selecting one of a half of n 48-bit inputs;
   8 S-Boxes, each for receiving 6-bit address among the selected 48-bit and outputting 4-bit data;
   a demultiplexer for distributing 4-bit data from each of the S-Boxes to the half of n outputs; and
   a controller to control the multiplexer and the demultiplexer with a third clock and a fourth clock,
   wherein the third and the fourth clocks are faster than the first and the second clocks by n/2 times.

2. The device as recited in claim 1, wherein the third clock is an inverse signal of the fourth clock.

3. The device as recited in claim 2, wherein the multiplexer and the demultiplexer perform time division between the half of n input paths and between the half of n output paths, respectively, to thereby avoid data collision.

4. An encryption device for performing encryption of plain text blocks using data encryption standard algorithm, wherein the encryption device includes an initial permutation unit, a data encryption unit having 8-stage pipeline structure using a first clock and a second clock and an inverse initial permutation unit, wherein the improvement includes:
   a first multiplexer for selecting one of a first and a second 48-bit inputs;
   a first S-Box unit having 8 S-Boxes, each S-Box for receiving 6-bit address among selected 48-bit from the first multiplexer and outputting 4-bit data;
   a first demultiplexer for distributing 4-bit data from each of the S-Boxes to one of a first and a second outputs;
   a first controller for controlling the first multiplexer and the first demultiplexer with a third clock and a fourth clock;
   a second multiplexer for selecting one of a third and fourth 48-bit inputs;
   a second S-Box unit having 8 S-Boxes, each S-Box for receiving 6-bit address among selected 48-bit from the second multiplexer and outputting 4-bit data;
   a second demultiplexer for distributing 4-bit data from each of the S-Boxes to one of a third and a fourth outputs; and
   a second controller for controlling the second multiplexer and the second demultiplexer with the third clock and the fourth clock,
   wherein the third and the fourth clocks are faster than the first and the second clocks by two times.

5. The device as recited in claim 4, wherein the third clock is an inverse signal of the fourth clock.

6. The device as recited in claim 5, wherein the first multiplexer and the first demultiplexer perform time division between two input paths and between two output paths, respectively, to thereby avoid data collision.

7. The device as recited in claim 6, wherein the second multiplexer and the second demultiplexer perform time division between two input paths and between two output paths, respectively, to thereby avoid data collision.

* * * * *